US012008387B2

United States Patent
Ehdaie et al.

(10) Patent No.: US 12,008,387 B2
(45) Date of Patent: Jun. 11, 2024

(54) TARGETING FUNCTIONALITY FOR INTEGRATING AN RPA BOT WITH AN APPLICATION

(71) Applicant: Nintex UK Ltd., London (GB)

(72) Inventors: Sasan Ehdaie, Bellevue, WA (US); Kyle Claudy Dierking, Bellevue, WA (US); Eric Herrera, Bellevue, WA (US)

(73) Assignee: Nintex UK Ltd., London (GB)

( * ) Notice: Subject to any disclaimer, the term of this patent is extended or adjusted under 35 U.S.C. 154(b) by 0 days.

(21) Appl. No.: 17/586,489

(22) Filed: Jan. 27, 2022

(65) Prior Publication Data

US 2022/0237004 A1    Jul. 28, 2022

Related U.S. Application Data

(60) Provisional application No. 63/142,309, filed on Jan. 27, 2021.

(51) Int. Cl.
*G06F 9/451* (2018.01)
*G06F 9/455* (2018.01)

(52) U.S. Cl.
CPC .......... *G06F 9/451* (2018.02); *G06F 9/45512* (2013.01)

(58) Field of Classification Search
CPC .............................. G06F 9/451; G06F 9/45512
See application file for complete search history.

(56) References Cited

U.S. PATENT DOCUMENTS

| | | | | |
|---|---|---|---|---|
| 5,872,974 | A * | 2/1999 | Mezick | G06F 8/30 717/109 |
| 6,721,950 | B1 * | 4/2004 | Lupu | G06F 9/451 719/310 |
| 7,100,123 | B1 * | 8/2006 | Todd | G06F 16/30 715/272 |
| 11,294,793 | B1 * | 4/2022 | Stan | G06F 11/362 |
| 2021/0200560 | A1 * | 7/2021 | Munteanu | G06N 5/025 |
| 2022/0012025 | A1 * | 1/2022 | Grigore | G06F 8/38 |
| 2022/0035641 | A1 * | 2/2022 | Singh | B25J 13/06 |

OTHER PUBLICATIONS

Microsoft.com, "NativeWindow.Handle Property", Dec. 6, 2019, Microsoft.com, https://web.archive.org/web/20191206173351/https://docs.microsoft.com/en-us/dotnet/api/system.windows.forms.nativewindow.handle?view=netframework-4.8, pp. 1-3 (Year: 2019).*

* cited by examiner

*Primary Examiner* — Daniel W Parcher
(74) *Attorney, Agent, or Firm* — Perkins Coie LLP

(57) ABSTRACT

Disclosed herein are systems and method for robotic-process-automation technology that trains botflows to successfully interact with application software, determine relevant sections of the application, and derive pertinent data from those sections. Such technology creates botflows that navigate various aspects of the application's environment to display or obtain additional data, as needed by the user. The botflows, after being trained to perform such actions, will effectively carry out such actions even after a minor change or update to the application.

17 Claims, 10 Drawing Sheets

TARGETING FUNCTIONALITY FOR INTEGRATING AN RPA BOT WITH AN APPLICATION

CROSS-REFERENCE TO RELATED APPLICATIONS

This application claims benefit to U.S. Provisional Application No. 63/142,309 filed on Jan. 27, 2021, and titled Targeting Functionality for Integrating an RPA Bot with an Application, the contents all of which are incorporated by reference herein as though set forth in their entirety and to which priority and benefit are claimed.

FIELD OF USE

The present disclosure relates generally to a system and method for robotic-process-automation technology that can—without requiring multiple programs, botflows, extensive user engagement, or multiple steps to be completed in a single botflow—train botflows to successfully interact with application software, correctly determine relevant sections of the application, and derive pertinent data from those sections. Such technology will create botflows that also navigate various aspects of the application's environment to display or obtain additional data, as needed by the user. The botflows, after being trained to perform such actions, will effectively carry out such actions even after a minor change or update to the application that does not drastically change the layout.

BACKGROUND

Robotic process automation ("RPA") is software technology that enables the automation of various computer tasks and computer-based business processes. Process automation and botflow automation technology—similar to RPA technology—is used to streamline processes typically done by a human on a computer. This technology creates botflows by training software "Bots" or "RPA Bots" on the exact rule-based logic underlying a given task. The botflows work at the surface and user-interface level, mimicking the keystrokes and mouse clicks made by human users and completing tasks in much the same way as a user would. Once trained, botflows are deployed to run automatically, independent of user interaction. Notably, botflows can be implemented in drag-and-drop interfaces and do not require the use of code or technical skills.

This technology allows for quick and cost-effective automation of routine tasks that revolve around the use or manipulation of structured and unstructured data sources—such as transferring data from an email to an electronic worksheet or pulling data from SAP™ software into a data file or external database. Botflows may also be designed to automate work seamlessly in certain desktop applications, web applications, websites, Excel™ documents, PDF documents, and SAP applications, as well as completing tasks such as running PowerShell scripts, connecting to FTP servers, manipulating images, manipulating files and folders, and retrieving and manage email.

The technology to create botflows, however, has its limitations. Specifically, certain executable tasks within an application (i.e., Word,™ Internet Explorer,™ Acrobat™) may not be defined as a set action (such as a built-in command for converting a Word™ document to PDF). In these instances, the user must either manually perform the action or create a botflow to mimic the user interface to perform the action. Training the botflow to perform the action is done by simulating the sequence of steps and interactions with the application to accomplish the action, such as specific mouse-motions and keystrokes. The simulated steps and interactions must train and enable the botflow to subsequently recognize the application every time it must carry out the action, correctly determine what sections of the application to engage with, and then derive data from the selected sections.

But current RPA technology does not provide one single, comprehensive technological tool that can be used to train a bot to integrate with any and all supported applications. Instead, existing RPA tools and solutions vary with the types of targets (e.g., applications, tasks, steps) being automated—they require the end user to select one of many tools depending on the type of target being automated. For example, users would need to select one type of tool for automating web applications and a different type of tool for automating desktop applications. This burdens the end user with having to know what technology the target application is built upon as well as knowing which tool to choose when building an automated task. Existing RPA solutions also require a user to select the target control only after an action has been selected. That is, a user would first select the desired action (such as a click) followed by selecting the target to which the action will be applied (such as a button in an application). If the selected target does not support the action, the user is stopped and told the action is not compatible with the selected target. In short, current RPA technology requires a combination of multiple steps or actions to correctly and efficiently interact with an application, determine relevant portions, and build the desired automated step in the application.

So, what is needed are novel systems, methods, and processes for RPA technology that can—without requiring multiple programs, botflows, or having to understand and select the proper tool, or multiple steps to be completed in a single botflow—train botflows to successfully interact with applications, correctly determine relevant sections of the application, and derive pertinent data from those sections. Such technology will create botflows that also navigate various aspects of the application's environment to display or obtain additional data, as needed by the user.

SUMMARY

The following presents a simplified overview of the example embodiments in order to provide a basic understanding of some embodiments of the present disclosure. This overview is not an extensive overview of the example embodiments. It is not intended to identify key or critical elements of the example embodiments, nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

The present disclosure is directed to systems and methods for training a device to successfully interact with an application, comprising: placing, by the device, a target mechanism over a control within the application; determining, by the device, the coordinates of the target mechanism; capturing, by the device, the location of the target mechanism; acquiring, by the device and using the target mechanism location, a window handle of the application window below the target mechanism; ascertaining, by the device and using the window handle, the application window's ClassName; determining, by the device, the target mechanism is positioned above a GUI window; connecting the device to the application GUI; and integrating the device to the application, wherein the device can automatically interact with the application.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure. In certain instances, details that are not necessary for an understanding of the disclosure or that render other details difficult to perceive may have been omitted.

DETAILED DESCRIPTION OF EMBODIMENTS

Before the present systems and methods are disclosed and described, it is to be understood that the systems and methods are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1:
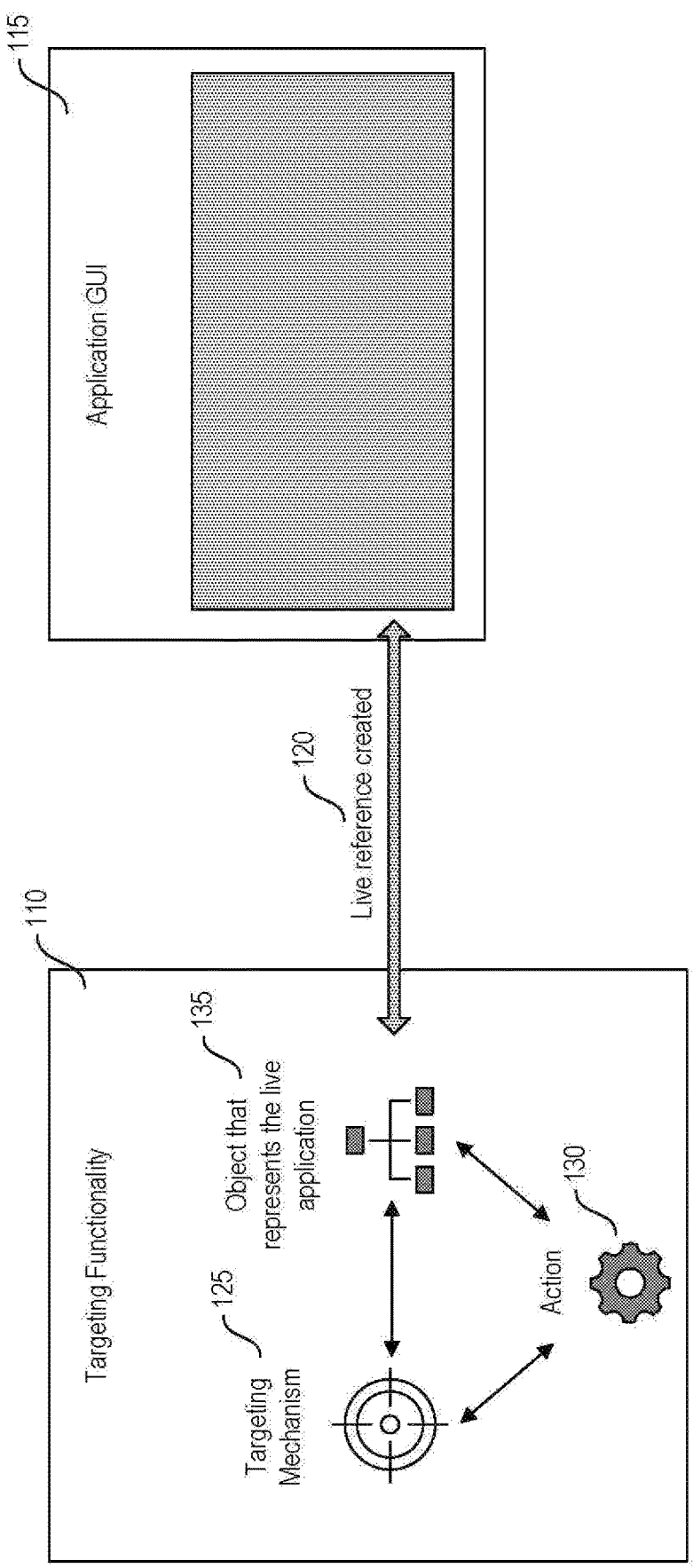
FIG. 1 illustrates an exemplary overview of the targeting functionality for integration of an application within a botflow described herein.

FIG. 1 illustrates an exemplary overview of the targeting functionality for integration of an application within a botflow as described herein. As shown in FIG. 1, the targeting functionality for integration of an application within a botflow (this functionality is referred throughout the remainder of this disclosure as "Targeting Functionality") 110 enables the creation of a botflow that can interact with an application's graphical user interface ("GUI") 115 both at the time of creation and during subsequent executions of the botflow. The Targeting Functionality 110 accomplishes this by the use of a targeting mechanism 125 to create a live reference 120 of the application's GUI 115. When the live reference 120 is created, the Targeting Functionality uses coordinates of the targeting mechanism 125 to determine the action 130 to be created and used and produces an object 135 that represents the live application.

Figure 2:
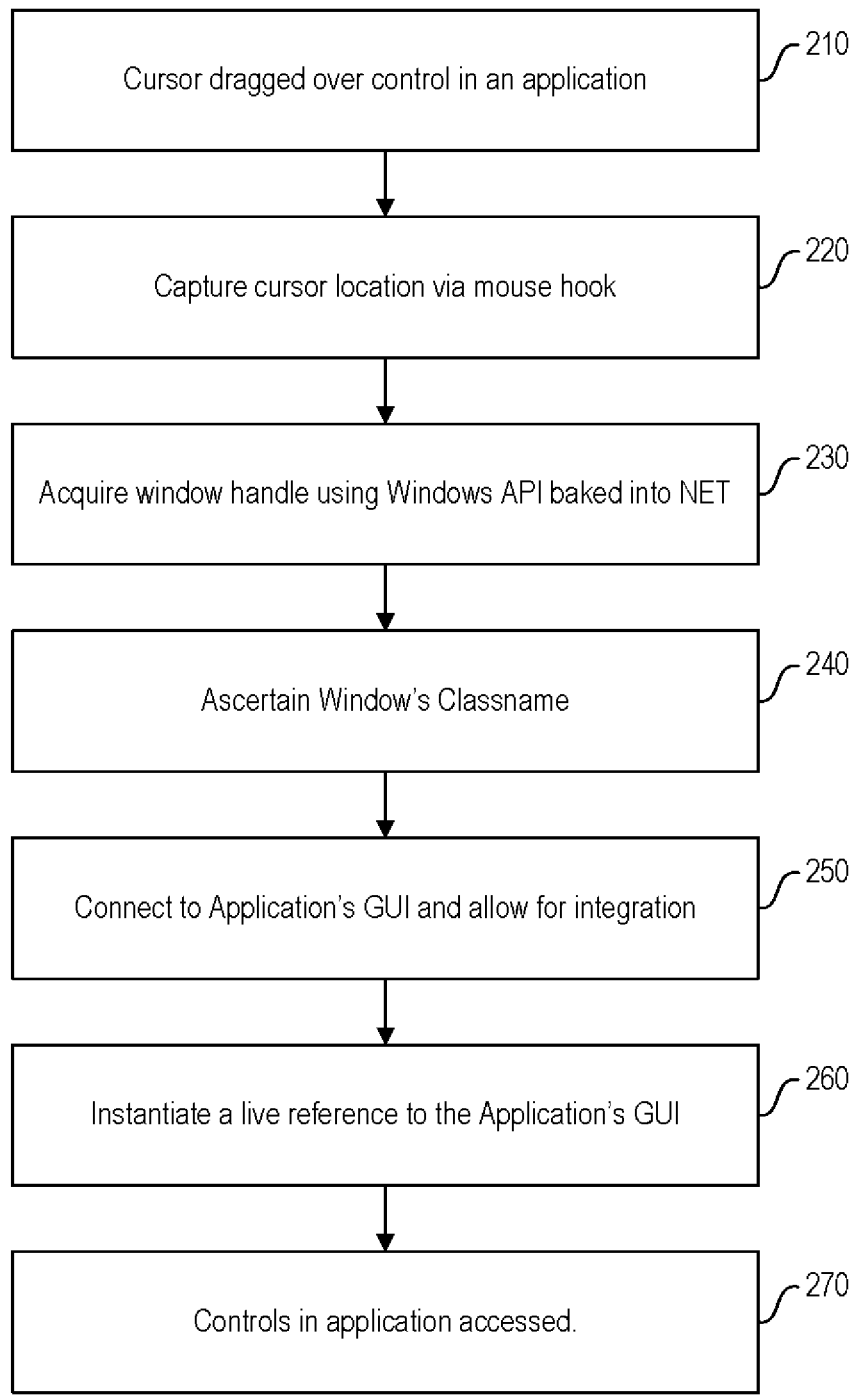
FIG. 2 is a flowchart generally illustrating an embodiment of the targeting functionality for integration of an application within a botflow.

FIG. 2 is a flowchart generally illustrating an embodiment of the targeting functionality for integration of an application within a botflow. In one embodiment of this disclosure, as shown in FIG. 2, a cursor, such as the targeting mechanism 125, is dragged over 210 a control within an application. For example, the cursor may be dragged over the Get Value action in Excel™ or the Create a Graph in Word.™ The Targeting Functionality captures 220 the cursor location via a mouse hook. Using the cursor location and the Windows™ application programming interface ("API") baked into .NET, the Targeting Functionality acquires 230 the window handle of the application window below the cursor. With the window handle, the Targeting Functionality can ascertain 240 the application window's ClassName. The ClassName is used to determine if the cursor is over a GUI window. When the Targeting Functionality detects that the cursor is over the GUI, it connects to the application GUI and allows for integration 250. The integration uses the application's GUI scripting engine. This integration enables the Targeting Functionality to instantiate 260 a live reference to the GUI. Once a live reference has been established, all controls located within the application can be accessed 270.

In one embodiment of this disclosure, the Targeting Functionality interacts with an SAP application for integration of the SAP application. To integrate with the SAP application, the Targeting Functionality uses the SAP GUI Scripting API by utilizing dll connections—such as SAPFEWSELib.dll and SapROTWr.dll—that are already installed with the SAP GUI. The dlls reveal methods that allows the Targeting Functionality to instantiate 260 a live reference to the SAP GUI application. Once a live reference is established, all of the controls located within the SAP application can be accessed in a tree format.

Figure 3:
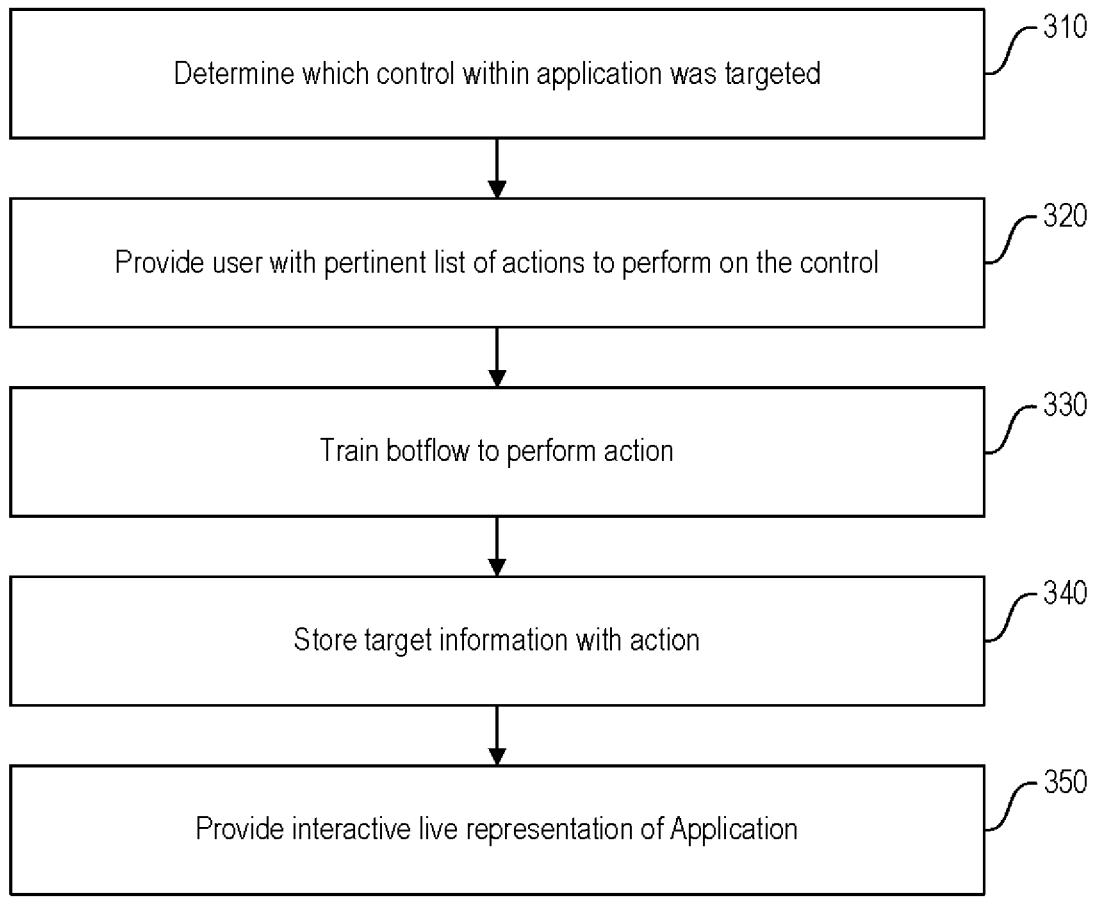
FIG. 3 is a flowchart generally illustrating an embodiment of the targeting functionality for creating an interactive live representation of an application within a botflow.

FIG. 3 is a flowchart generally illustrating an embodiment of the Targeting Functionality for creating an interactive live representation of an application within a botflow. As shown in FIG. 3, when the cursor button is released, the Target Functionality determines 310 which control within the application GUI was targeted. It may do so by using a combination of control hierarchy and control screen relative to the cursor coordinates. Based upon the type of control targeted, the Target Functionality provides the user with a pertinent list of actions to perform 320 on the control. The user may then train 330 the botflow to perform the action immediately or at a later time. At this point, target information, such as the type of control and the ID, is stored 340 with the action. This enables the Targeting Functionality to find and access the target control in the future without the use of the targeting mechanism. The Targeting Functionality is then set to provide an interactive live representation of the Application.

In one embodiment, action forms may help users find the specific target they wish to interact with. For example, when the Targeting Functionality interacts with the SAP treeview control, due to the treeview setup not all of the nodes are loaded until they are clicked on. In order to handle this, the user may expand and collapse the treeview in the live representation and the node simultaneously expands or collapses in SAP. Thus, the Targeting Functionality enables the botflow to always have a live representation of what is in the SAP treeview. In other embodiments, similar actions are carried out on targets such as comboboxes, allowing the user to choose the exact option from the dropdown menu while still within the botflow action form.

Figure 4:
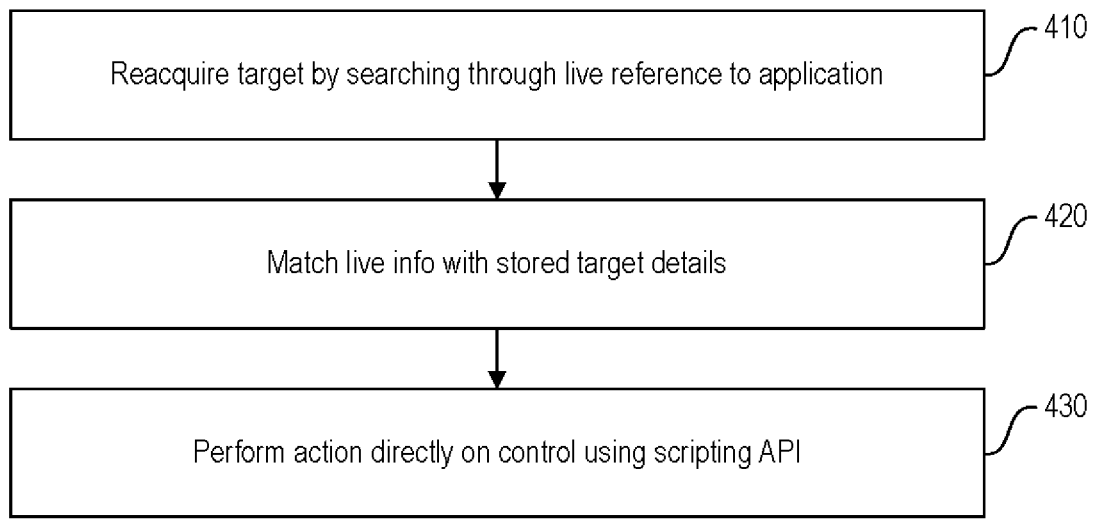
FIG. 4 is a flowchart generally illustrating an embodiment of a botflow executing an action via an integrated application, wherein the botflow was created by use of the targeting functionality for integration of application.

FIG. 4 is a flowchart generally illustrating an embodiment of a botflow executing an action via an integrated application, wherein the botflow was created by use of the Targeting Functionality for integration of application. In one embodiment, when a botflow executes an action, the Targeting Functionality reacquires 410 the target by intelligently searching through the live reference to the application GUI. It then matches 420 live information with the stored target details. Once found, the action is performed 430 directly on the control using the GUI Scripting API. In some embodiments, these actions comprise selecting buttons, selecting items from a dropdown, selecting items from a treeview, setting the text of a text box or password field, and navigating controls in a table.

Figure 5:
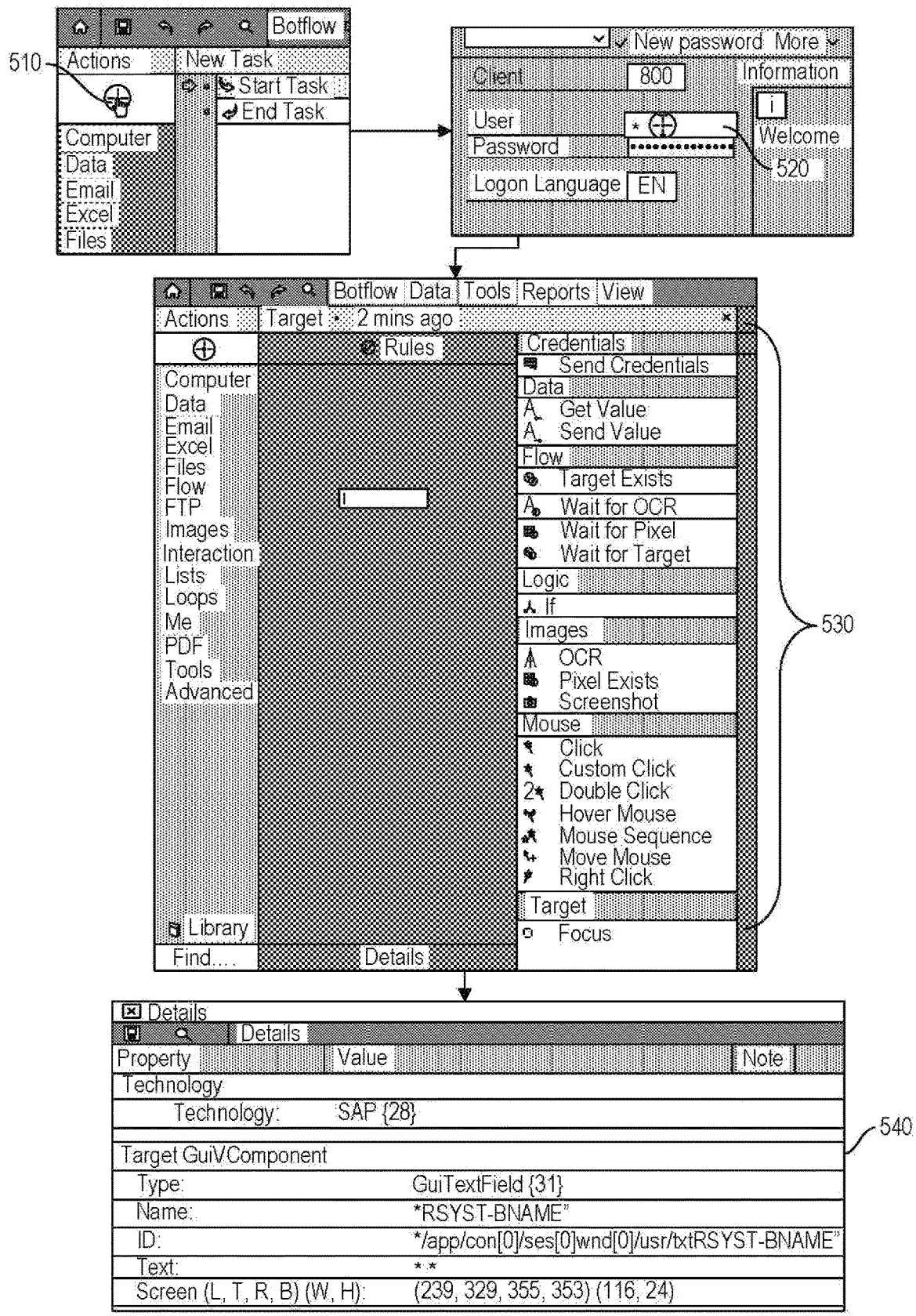
FIG. 5 illustrates an embodiment of the targeting functionality for integration of an application within a botflow.

FIG. 5 illustrates an embodiment of the Targeting Functionality for integration of an application within a botflow. As shown in FIG. 5, the Targeting Functionality may use a targeting mechanism 510 to target over 520 a control within an application. Based upon the type of control targeted, the Target Functionality provides the user with a pertinent list of actions 530 to perform on the control. Simultaneously, the target information is stored 540 with the action.

Figure 6:
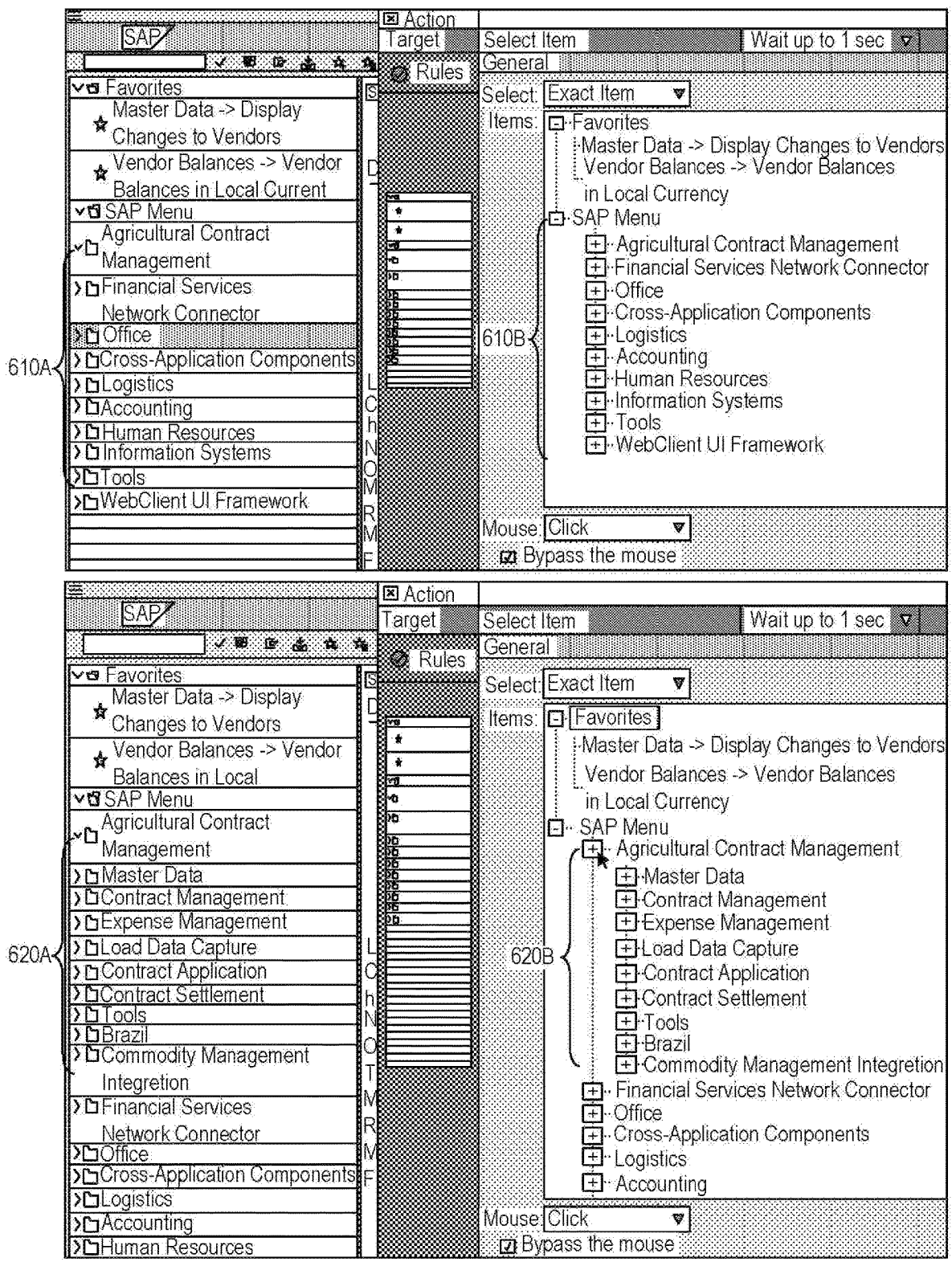
FIG. 6 illustrates an embodiment of the representation of the live application created by the Targeting Functionality.

FIG. 6 illustrates an embodiment of the representation of the live application created by the Targeting Functionality. As shown in FIG. 6, the Targeting Functionality may enable the live representation of the application previously integrated. For example, the treeview in the botflow 610B reflects the same treeview in the 610A in the application. Similarly, the treeview in the botflow may be expanded 620B, thus revealing the same expanded treeview 620A within the integrated application.

Figure 7A:
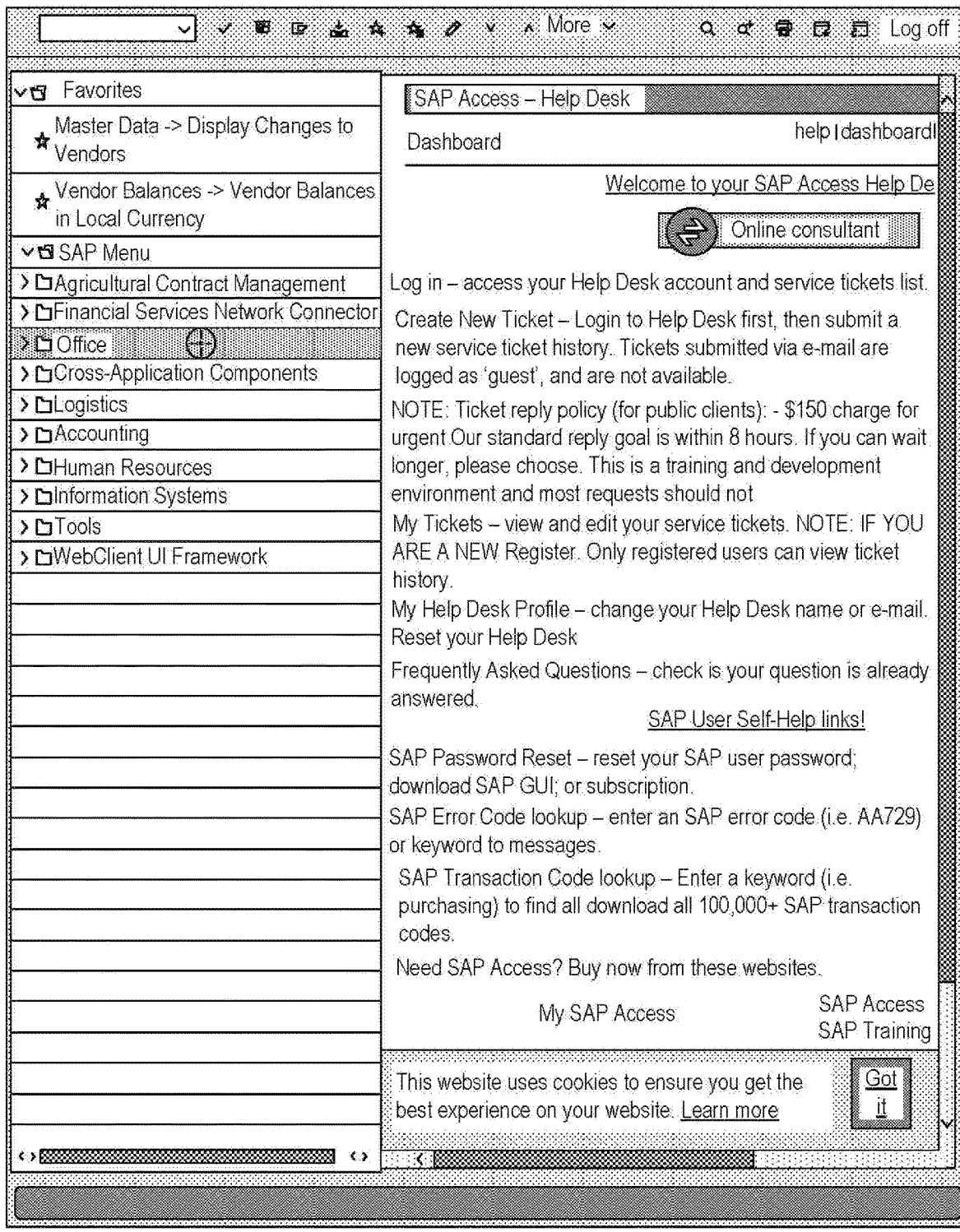
FIG. 7A illustrates an embodiment of an integrated application within a botflow.

FIG. 7A illustrates an embodiment of an integrated application within a botflow. FIG. 7A illustrates a user dragging the bullseye to a navigation menu, such as a navigation menu in SAP. The navigation menu is boxed with a thick black box informing the user of the part of the application that will be used to train the botflow. Once the user lets go of the mouse button and "drops" the bullseye on the target, the Targeting Functionality captures necessary metadata about that selected target.

Figure 7B:
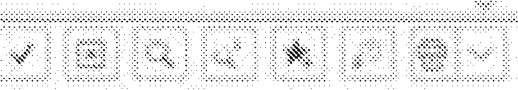
FIG. 7B illustrates an embodiment of an application that may be integrated within a botflow by the Targeting Functionality.

FIG. 7B illustrates an embodiment of an application that may be integrated within a botflow by the Targeting Functionality. An application to be integrated may have a control like the one shown in FIG. 7B. But such controls may not conform to the standards of an application's GUI scripting API. And even in using the GUI scripting API, the control shown in FIG. 7B may be just a series (or grouping) of labels on the screen, with no inherent structure other than their proximity between each other. To create structure and provide organization when anticipating engagement with such controls, the Targeting Functionality's novel approach uses the ID of each label and deduces a structure comparable to a grid (hereinafter referred to as "Label Grid" for convenience). Each label in the Label Grid has an ID that corresponds to its row and column within the grid, such as (1,2).

Despite the benefit of the Label Grid's structure, IDs within controls like the one in FIG. 7B poses challenges to capturing data due to their dynamic nature. For example, the first row and first column are given an ID of (0,0), which corresponds with the label in the first row and column. But the label changes as a user scrolls through the list. The Targeting Functionality addresses this problem in a novel approach by first loading dynamically the labels and placing it in the Label Grid. As the target selector is hovered over one of the labels within the Label Grid, the Targeting Functionality boxes in each individual label, or "cell." In analyzing the ID of the cell, the Targeting Functionality is able to determine that it is working with a Label Grid. When it recognizes a Label Grid, the Targeting Functionality automatically assumes that the action the user wants to take should target the entire Label Grid and not just one specific cell in the Label Grid.

In one embodiment, the Targeting Functionality receives data from a user, such as through a Search function, for what text to find and obtain from the Label Grid. At this point, the Targeting Functionality has determined what the column headers are and will provide the option to search in all columns or a specific column. When the Search function is executed, the Targeting Functionality programmatically scrolls through the Label grid in order to continuously load in more rows to search in. Such method of the Targeting Functionality is used in the execution of every application's action that supports Label Grids, such as Select Item and Get List.

Figure 8:
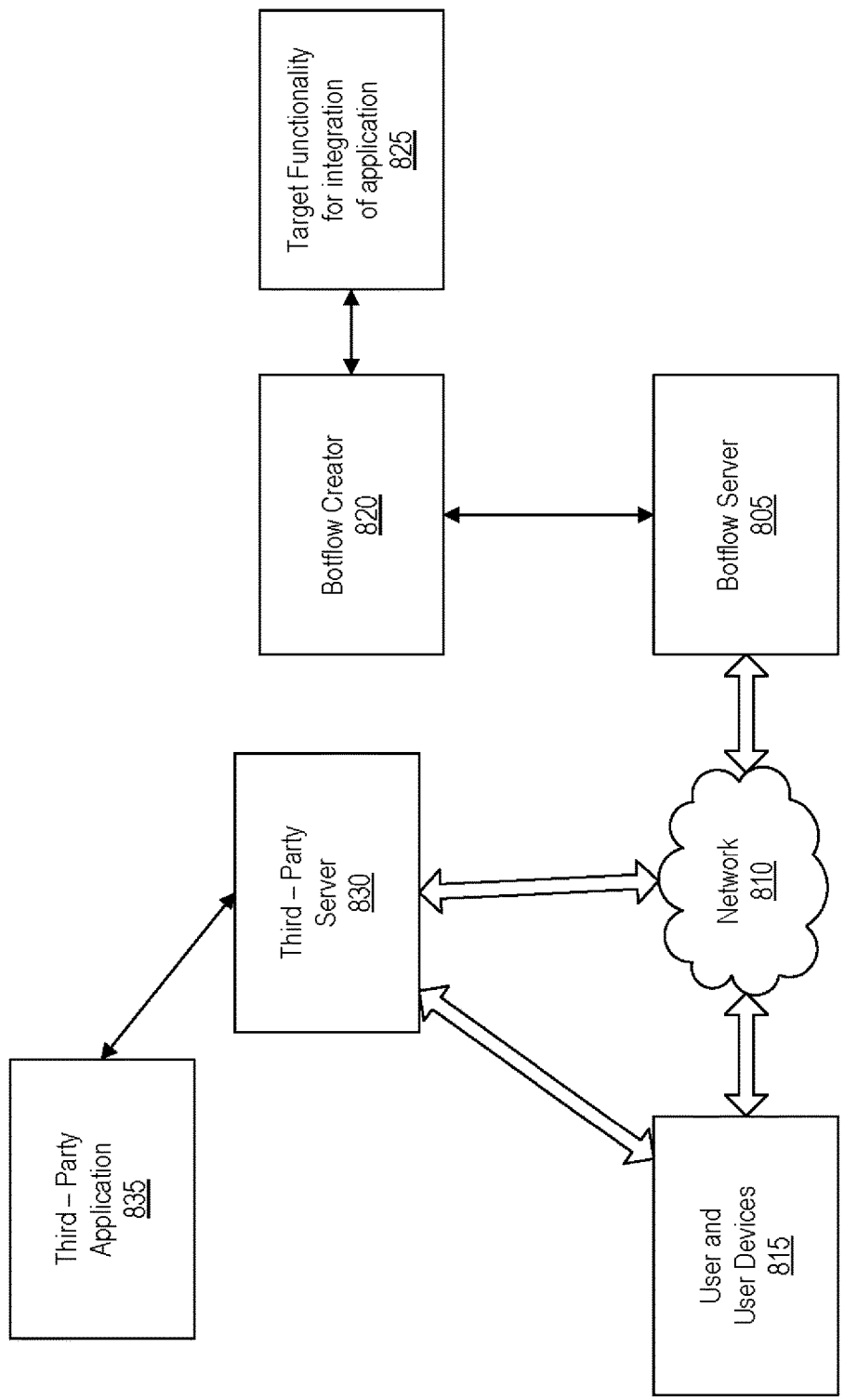
FIG. 8 is a functional block diagram generally illustrating an embodiment of a network system of a botflow designer system utilizing the Targeting Functionality for integration of an application within a botflow.

FIG. 8 is a functional block diagram generally illustrating an embodiment of a network system of a botflow designer system utilizing the Targeting Functionality. Shown in FIG. 8 is a botflow server 805 accessible over a local area network or a wide area network 810, such as the Internet, by one or more user electronic devices 815. As illustrated, the botflow server 805 hosts one or more high-level botflow creators 820, each accessible to their respective owners and other users. The botflow creator 820 utilizes the Targeting Functionality for integration of an application 825. In accordance with the preferred embodiment, the botflow server 805 is remotely accessible by a number of user computing devices 815, including, for example, laptops, smartphones, computers, tablets, and other computing devices that are able to access the local area network or a wide area network 810 where the botflow server 805 resides. In normal operation, each user electronic device 815 connects with the botflow server 805 to interact with the botflow creator 820 to then use the Targeting Functionality 825. As required for integration of third party applications, each botflow creator 820 may employ a number of connectors to interact with third party 830 servers to access third-party applications data, or services 835, such as SAP™, Salesforce™, Facebook™, Twitter™, various cloud services, or any other data or service accessible through a network, including local area networks (for example a local application that is exposed as a Web Service residing on-premises) or wide area networks (for example the Internet).

Figure 9:
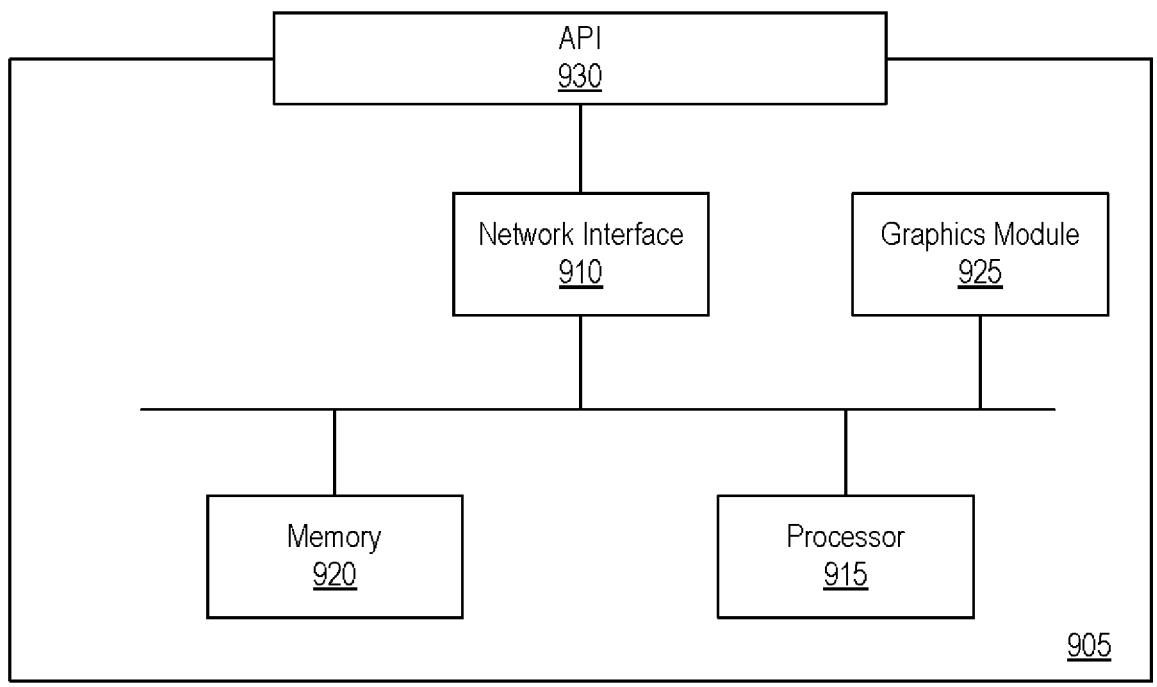
FIG. 9 is a functional block diagram generally illustrating an embodiment of an electronic device system of a botflow designer system.

FIG. 9 is a functional block diagram generally illustrating an embodiment of an electronic device system of a botflow designer system employing the Targeting Functionality. The electronic device 905 may be coupled to the botflow server 805 via a network interface 910 and a network 810. The electronic device 905 generally comprises a processor 915, a memory 920, a graphics module 925, and an application programming interface 930. The electronic device 905 is not limited to any particular configuration or system.

Other embodiments may include combinations and sub-combinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, "feature" or "features" can refer to structures and/or functions of an apparatus, article of manufacture or system, and/or the steps, acts, or modalities of a method.

References throughout this specification to "one embodiment," "an embodiment," "an example embodiment," etc., indicate that the embodiment described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with one embodiment, it will be within the knowledge of one skilled in the art to affect such feature, structure, or characteristic in connection with other embodiments whether or not explicitly described.

Unless the context clearly indicates otherwise (1) the word "and" indicates the conjunctive; (2) the word "or" indicates the disjunctive; (3) when the article is phrased in the disjunctive, followed by the words "or both," both the conjunctive and disjunctive are intended; and (4) the word "and" or "or" between the last two items in a series applies to the entire series.

Where a group is expressed using the term "one or more" followed by a plural noun, any further use of that noun to refer to one or more members of the group shall indicate both the singular and the plural form of the noun. For example, a group expressed as having "one or more members" followed by a reference to "the members" of the group shall mean "the member" if there is only one member of the group.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed is:

1. A method for training a device to successfully interact with an application, comprising:
   placing, by the device, a target mechanism over a first control of the application;
   capturing, by the device, a location of the target mechanism, wherein the target mechanism and the application are separate;
   acquiring, by the device and using the target mechanism location, a window handle of an application window below the target mechanism;
   ascertaining, by the device and using the window handle, a ClassName of the application window;
   determining, by the device and using the ClassName, whether the target mechanism is positioned above a GUI window of the application;
   responsive to determining the target mechanism is positioned above a GUI window of the application:
   (1) connecting the device to a GUI of the application; and
   (2) integrating the device to the application,
      wherein integrating the device to the application comprises the device being automated to interact with the application by:
      (i) obtaining, by the device, a GUI scripting API of the application; and
      (ii) generating, by the device, a live reference to the GUI using the GUI scripting API such that controls located within the application are accessible by the device;
   responsive to determining the target mechanism is not positioned above a GUI window of the application, preventing the integrating the device to the application; and
   listing the controls located within the application that are accessible by the device in a tree view format using the live reference to the GUI.

2. The method of claim 1, comprising:
   accessing, by the device, one or more of the first control and a second control of the application.

3. The method of claim 1, further comprising:
   identifying, by the device, the control positioned below the target mechanism;
   providing, by the device, one or more actions capable of being performed by the control; and
   storing, by the device, information relevant to the control and the one or more actions capable of being performed by the control.

4. The method of claim 3, further comprising:
   searching, by the device, the application GUI for new information relevant to one or more controls;
   identifying, by the device, new information relevant to the one or more controls; and
   comparing, by the device, the new information relevant to the one or more controls to the stored information relevant to the control.

5. The method of claim 1, wherein the device captures the location of the target mechanism via a hook procedure.

6. The method of claim 1, wherein acquiring the window handle of the application window comprises using an API baked into a developer platform.

7. A non-transitory computer-readable medium storing instructions, the instructions comprising:
   one or more instructions that, when executed by one or more processors, cause the one or more processors to:
   place a target mechanism over a first control of an application;
   capture a location of the target mechanism, wherein the target mechanism and the application are separate;
   acquire, using the target mechanism location, a window handle of the application window below the target mechanism;

ascertain, using the window handle, a ClassName of the application window;
determine, using the ClassName, whether the target mechanism is positioned above a GUI window;
responsive to determining the target mechanism is positioned above a GUI window of the application:
  connect to a GUI of the application; and
  integrate the one or more processors to the application,
    wherein integrating to the application comprises the one or more processors being automated to interact with the application by:
      (i) obtaining a GUI scripting API of the application; and
      (ii) generating a live reference to the GUI using the GUI scripting API such that controls located within the application are accessible by the one or more processors;
responsive to determining the target mechanism is not positioned above a GUI window of the application, preventing the integration of the one or more processors to the application; and
list the controls located within the application that are accessible by the one or more processors in a tree view format using the live reference to the GUI.

8. The non-transitory computer-readable medium storing instructions of claim 7, wherein the instructions cause the one or more processors to:
access one or more of the first control and a second control of the application.

9. The non-transitory computer-readable medium storing instructions of claim 7, wherein the instructions further cause the one or more processors to:
identify the control positioned below the target mechanism;
provide one or more actions capable of being performed by the control; and
store information relevant to the control and to the one or more actions capable of being performed by the control.

10. The non-transitory computer-readable medium storing instructions of claim 9, wherein the instructions further cause the one or more processors to:
search the application GUI for new information relevant to one or more controls;
identify new information relevant to the one or more controls; and
compare the new information relevant to the one or more controls to the stored information relevant to the control.

11. The non-transitory computer-readable medium storing instructions of claim 7, wherein the one or more processors capture the location of the target mechanism via a hook procedure.

12. The non-transitory computer-readable medium storing instructions of claim 7, wherein acquiring the window handle of the application window comprises using an API baked into a developer platform.

13. A system for training a device to successfully interact with an application comprising a non-transitory computer-readable medium having instructions stored thereon, which when executed by one or more processors of the system cause the system to:
placing, by the device, a target mechanism over a first control of the application;
capturing, by the device, a location of the target mechanism, wherein the target mechanism and the application are separate;
acquiring, by the device and using the target mechanism location, a window handle of an application window below the target mechanism;
ascertaining, by the device and using the window handle, a ClassName of the application window;
determining, by the device and using the ClassName, whether the target mechanism is positioned above a GUI window of the application;
responsive to determining the target mechanism is positioned above a GUI window of the application:
  connecting the device to a GUI of the application; and
  integrating the device to the application,
    wherein integrating the device to the application comprises the device being automated to interact with the application by:
      (i) obtaining, by the device, a GUI scripting API of the application; and
      (ii) generating, by the device, a live reference to the GUI using the GUI scripting API such that controls located within the application are accessible by the device;
responsive to determining the target mechanism is not positioned above a GUI window of the application, preventing the integrating the device to the application; and
listing the controls located within the application that are accessible by the device in a tree view format using the live reference to the GUI.

14. The system of claim 13, comprising:
accessing, by the device, one or more of the first control and a second control of the application.

15. The system of claim 13, further comprising:
identifying, by the device, the control positioned below the target mechanism;
providing, by the device, one or more actions capable of being performed by the control; and
storing, by the device, information relevant to the control and the one or more actions capable of being performed by the control.

16. The system of claim 15, further comprising:
searching, by the device, the application GUI for new information relevant to one or more controls;
identifying, by the device, new information relevant to the one or more controls; and
comparing, by the device, the new information relevant to the one or more controls to the stored information relevant to the control.

17. The system of claim 16, wherein the device captures the location of the target mechanism via a hook procedure, and wherein acquiring the window handle of the application window comprises using an API baked into a developer platform.

* * * * *